July 16, 1957  F. J. VOBORIL  2,799,111
UNATTENDED FISHING ROD HOLDER WITH HOOK SETTING MEANS
Filed Sept. 17, 1956  2 Sheets-Sheet 1

Frank J. Voboril
INVENTOR.

July 16, 1957  F. J. VOBORIL  2,799,111
UNATTENDED FISHING ROD HOLDER WITH HOOK SETTING MEANS
Filed Sept. 17, 1956  2 Sheets-Sheet 2
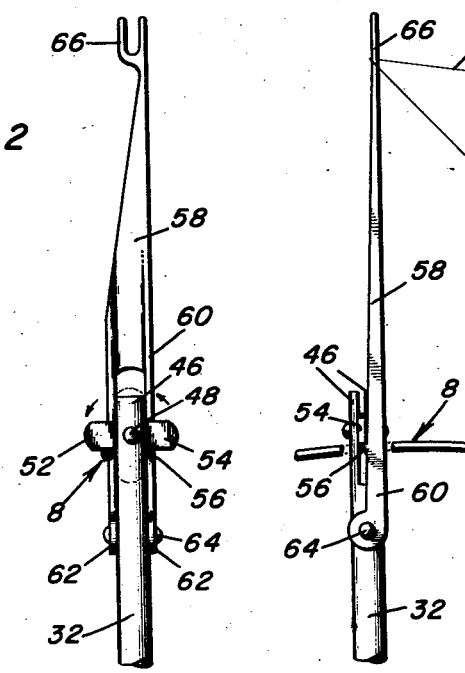
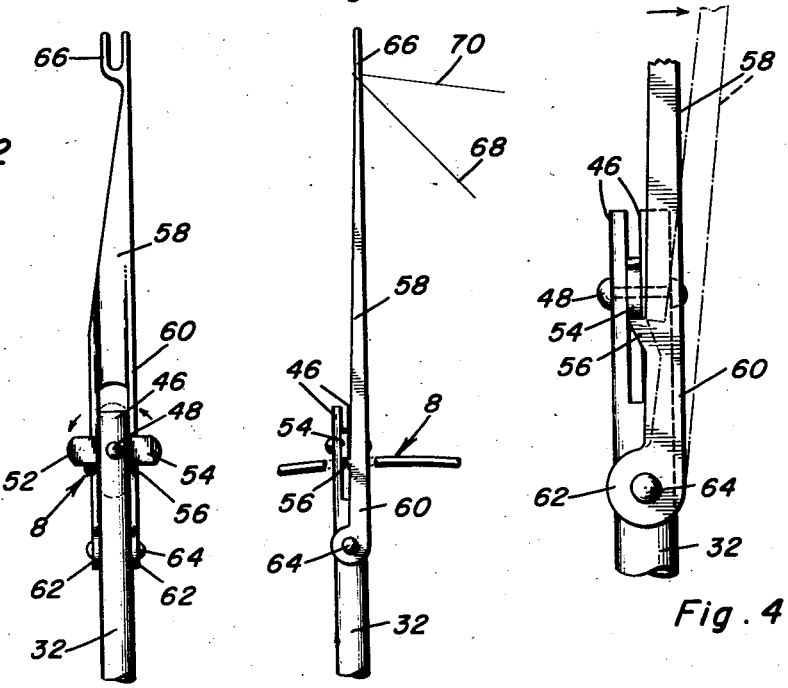
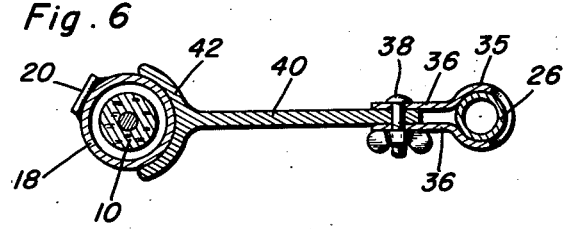
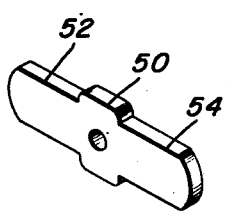
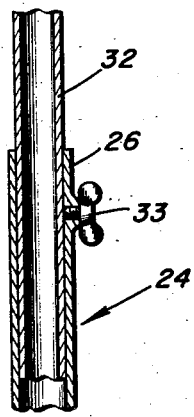
Frank J. Voboril
INVENTOR.

United States Patent Office 2,799,111
Patented July 16, 1957

2,799,111

UNATTENDED FISHING ROD HOLDER WITH HOOK SETTING MEANS

Frank J. Voboril, Dwight, Nebr.

Application September 17, 1956, Serial No. 610,152

4 Claims. (Cl. 43—15)

The present invention relates to an improved holder for a fishing rod of the so-called unattended type and which is characterized by novel pull actuated line jerking and fish hook setting means, whereby when a strike is had the stated means effectually catches the fish by setting the hook in the fish's mouth.

The object of the invention is to provide an improved construction which, it is believed, better fulfills the overall structural and functional requirements of an automatic fish catching device.

The invention in its preferred embodiment is characterized by a holder for the handle portion of a conventional-type fishing rod and reel combination, a manually liftable and gravity lowerable extensible and retractible boom, the lower end of which is hingedly mounted on said holder, said boom being provided at its upper end, that is when the boom is elevated and set, with a line actuated and tripped trigger, the latter cooperating with a hold-down latch for the bowed and tensioned fishing rod.

Other objects, features and advantages will become more readily apparent from the following description and the accompanying drawing.

In the drawing:

Fig. 2 is a view slightly enlarged on the line 2—2 of Fig. 1;

Fig. 3 is a view at right angles to Fig. 2 observing the same in a direction from right to left;

Fig. 4 is a view which is further enlarged and of a fragmentary type and which illustrates the particulars and how they cooperate;

Fig. 5 is a perspective view of the rod hold-down latch; and

Figure 1:
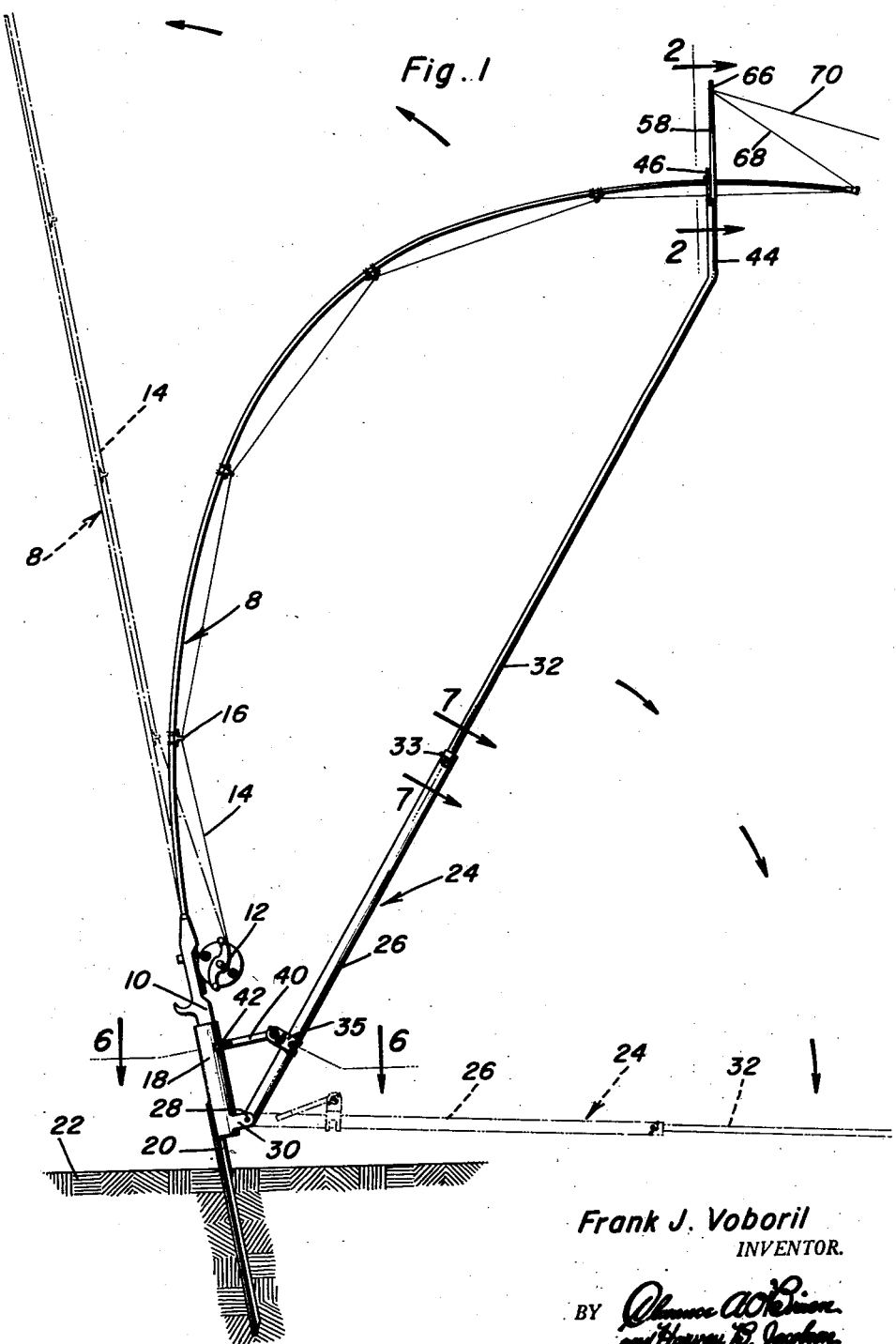
Fig. 1 is a side elevation of a reel-equipped conventional-type fishing rod, the holder, and means whereby the rod is flexed and placed under tension and is readied (in full lines) to make an intended catch.

Figs. 6 and 7 are sections on the lines 6—6 and 7—7, respectively of Fig. 1.

The fishing rod, which is conventional, is denoted by the numeral 8 and has the usual handle means 10 with a reel 12 mounted in the customary reel seat and with the fishing line 14 thereon and operating through guide eyes on the rod proper. This is a flexible rod and it is intended to be bowed and thus flexed in place under tension so that the inherent spring-back properties serve to impart a jerk to the fishing line which is sufficient to set the hook (not shown) in the fish's mouth in a manner now well known in the art.

The rod anchoring and holding device is characterized by a socket or an equivalent receiver 18. This is provided with a stake 20 which is driven into the ground 22. Instead of the stake it is within the purview of the invention to provide other means (not shown) whereby the socket may be anchored on a wharf, boat or the like. The aforementioned gravity lowerable boom (shown in its up position in full lines and down position in phantom lines in Fig. 1) is denoted by the numeral 24 and it is of telescoping extensible and retractible form. That is to say, it comprises a lower elongate socket section 26 having its lower end hingedly mounted at 28 between attaching ears or lugs 30 provided therefor on the holding socket 18. The upper telescoping section 32 is of suitable length and is held in varying adjusted positions by way of a set-screw 33 carried by the section 26. As shown in Fig. 6 a collar 35 is adjustably mounted on the boom section 26 and is provided with outstanding ears 36 detachably and adjustably connected at 38 with an arm 40 which functions as a prop. This is provided with a suitable rest 42 which is braced against the socket member 18 in the manner shown in full lines at the left in Fig. 1. This collar and prop arrangement is adjustable so that the angularity of the boom relative to the holding socket 18 may be regulated to best meet the varying and individual requirements, particularly with respect to fishing rods of varying lengths. The upper end of the boom section 32 is laterally directed as at 44 and is bifurcated to provide spaced furcations 46 having a hinge pin 48 which serves to position the central portion 50 of a double-ended latch therebetween. One end portion 52 projects beyond the furcations and when it is set as shown in the drawings it serves as a hold-down member for the bowed and tensioned fishing rod. The other projecting end portion 54 serves as a keeper for a cooperating detent 56 carried by the trigger finger 58. The latter has a sheath-like lower end portion 60 which terminates in ears 62 which are arranged on diametrical sides of the boom section and are hingedly mounted thereon as at 64. The extreme upper end of the trigger is provided with a fork 66. With this arrangement and by engaging the detent 56 with the keeper 54 and by rigging the fishing rod so that it is under tension and placed beneath the hold-down member 52 and arranging the trigger in the position shown the device is readied for operation. The outer end portion of the fishing line, that is the portion 68 is directed inwardly and is releasably engaged with the fork 66 and the outwardly directed portion 70 carries the baited fishing hook (not detailed).

With the holder, rod and boom assembled and set up as illustrated in full lines (Fig. 1) and detailed in the other figures it will be evident that the device is cocked and ready to function. It follows that when the fish takes the line in a well known manner and exerts a pull on the line, the portions 68 and 70 will exert the intended strain on the fork 66. This will, in turn, trip the trigger 58 (Fig. 4). When this happens, the detent 56 will be released from beneath the keeper portion 54 of the aforementioned pivoted latch. The latch will then be permitted to function in such a way that the tension of the rod on the hold-down member 52 will swing the latch in a direction from a set to a released position and the tension in the rod itself will exert the necessary jerk on the line to set the hook in the fish's mouth. At the same time the boom 24 will swing down to the out-of-the-way position seen in phantom lines in Fig. 1.

Minor changes in shape, size and rearrangement of parts may be resorted to in actual practice without departing from the spirit of the invention or scope of the invention as claimed.

What is claimed as new is as follows:

1. An unattended type fishing device for automatically setting a hook in a fish's mouth comprising a fishing rod, a rod holder for said rod embodying a socket having means for attachment to a stationary support, said socket being adapted to receive the handle portion of said fishing rod, a vertically liftable and lowerable boom having a lower section hingedly mounted on said socket member, and a companion upper section telescoping into the lower section and adjustably mounted therein, a collar carried by said boom, a prop hingedly mounted on said collar and having a rest and said rest being adapted to bear against said socket member, a latch hingedly mounted between its ends on the upper end of said boom, one end of said latch providing a hold-down member for a co-operating portion of the fishing rod when the latter is longitudinally bowed and placed under tension, the other end of said latch providing a keeper, a trigger operatively mounted on the upper end of the boom, said trigger being provided with a detent to be releasably engaged with said keeper, and a fishing line operatively mounted on said rod and having a predetermined portion releasably connected with said trigger.

2. An unattended type fishing device comprising a fishing rod, an extensible and retractable vertically disposed gravity lowerable boom, means hingedly connected to the lower end of said boom whereby it may be attached to a relatively stationary foundation, said means being in the form of a holder for said fishing rod, said boom being manually liftable to assume a set ready-to-operate position and having its upper end bifurcated, a latch having an intermediate portion hingedly mounted between the furcations, one end portion of said latch being adapted to project laterally beyond one side of the furcations to provide a rod hold-down member, the other end portion being adapted to project laterally beyond the other side of said furcations and serving as a keeper member, and a trigger pivotally mounted on said boom adjacent the furcations and having a line actuated fork on its upper end and a detent on its intermediate portion releasably engageable with said keeper member.

3. In combination, a holder for a fishing rod having means whereby the holder may be attached to a relatively stationary support, a conventional-type fishing rod having a flexible shaft portion and a handle portion equipped with a reel, the handle portion being removably and telescopingly fitted into said holder, said shaft portion extending well beyond the holder, a manually liftable, gravity lowerable boom hingedly connected at its lower end to said holder, a latch hingedly mounted between its ends on said boom, one end of said latch providing a rod hold-down member, the other end of said latch providing a keeper, the shaft portion of the fishing rod being longitudinally bowed and releasably located beneath the hold-down member, a trigger provided with a detent releasably engaged with said keeper, and a line operatively attached to the reel and rod and having a portion releasably connected with said trigger, said trigger having a sheath portion at its lower end hingedly mounted on said boom and a fork on its normal upper end with which said portion of the fishing line is releasably connected.

4. In combination, a holder for a fishing rod having means whereby the holder may be attached to a relatively stationary support, a conventional-type fishing rod having a flexible shaft portion and a handle portion equipped with a reel, the handle portion being removably and telescopingly fitted into said holder, said shaft portion extending well beyond the holder, a gravity lowerable boom hingedly connected at its lower end to said holder, a latch hingedly mounted between its ends on said boom, one end of said latch providing a rod hold-down member, the other end of said latch providing a keeper, the shaft portion of the fishing rod being longitudinally bowed and releasably located beneath the hold-down member, a trigger pivotally mounted on said boom, said trigger being provided with a detent releasably engaged with said keeper, and a line operatively attached to the reel and rod and having a portion releasably connected with said trigger, said boom comprising telescopically connected sections, whereby the boom may be extended or retracted to meet varying fishing and rod requirements.

References Cited in the file of this patent

UNITED STATES PATENTS

| | | |
|---|---|---|
| 202,818 | Hesse | Apr. 23, 1878 |
| 2,177,912 | Spitz et al. | Oct. 31, 1939 |
| 2,473,778 | Benes | June 21, 1949 |